US012673651B2

(12) United States Patent　　　　　　　(10) Patent No.:　US 12,673,651 B2
Casadio　　　　　　　　　　　　　　　　　(45) Date of Patent:　Jul. 7, 2026

(54) ACTUATING DEVICE FOR A BRAKE DISC

(71) Applicant: Brembo S.p.A., Curno (IT)

(72) Inventor: Andrea Casadio, Curno (IT)

(73) Assignee: Brembo, S.p.A., Bergamo (IT)

( * ) Notice: Subject to any disclaimer, the term of this patent is extended or adjusted under 35 U.S.C. 154(b) by 895 days.

(21) Appl. No.: 17/998,682

(22) PCT Filed: May 6, 2021

(86) PCT No.: PCT/IB2021/053826
§ 371 (c)(1),
(2) Date: Mar. 31, 2023

(87) PCT Pub. No.: WO2021/229375
PCT Pub. Date: Nov. 18, 2021

(65) Prior Publication Data
US 2023/0202445 A1　　Jun. 29, 2023

(30) Foreign Application Priority Data

May 14, 2020　(IT) ........................ 102020000010954

(51) Int. Cl.
*B60T 13/74*　　　　(2006.01)
*B60T 1/06*　　　　(2006.01)
(Continued)

(52) U.S. Cl.
CPC ............ *B60T 13/741* (2013.01); *B60T 1/065* (2013.01); *F16D 55/226* (2013.01);
(Continued)

(58) Field of Classification Search
CPC .. F16D 65/183; F16D 65/567; F16D 2125/36; F16D 2125/40; F16D 2125/56; F16D 2121/24; B60T 13/741; B60T 1/065
See application file for complete search history.

(56) References Cited

U.S. PATENT DOCUMENTS

| | | | |
|---|---|---|---|
| 3,115,217 A | 12/1963 | Butler | |
| 3,747,711 A * | 7/1973 | Burnett | ................. F16D 65/567 |
| | | | 188/71.9 |

(Continued)

FOREIGN PATENT DOCUMENTS

| | | | |
|---|---|---|---|
| DE | 19922333 A1 * | 11/2000 | ........... F16D 65/567 |
| DE | 102006019882 A1 | 11/2006 | |

(Continued)

OTHER PUBLICATIONS

Machine translation of DE 19922333 (no date).*

(Continued)

*Primary Examiner* — Nicholas J Lane
(74) *Attorney, Agent, or Firm* — Marshall & Melhorn, LLC

(57) ABSTRACT

An actuating device for a disc brake may have a piston, and a first ramp-ball motion converter having a first ramp portion axially constrained and actuatable in rotation around and actuating axis. The device may also have a second ramp portion coupled to the piston and a plurality of rolling elements interposed in contact between ramp tracks formed by the first and second ramp portion. The device may also have a second screw and nut motion converter connected between the second ramp portion and the piston. The device may also have a torque limiter that implements a torsional connection of the first ramp portion with the second ramp portion. The torque limiter may also decouple the rotation of the first ramp portion with respect to the second ramp portion about the actuating axis when a predetermined limit torque is exceeded.

19 Claims, 15 Drawing Sheets

(51) Int. Cl.
  *F16D 55/226* (2006.01)
  *F16D 65/18* (2006.01)
  *F16D 65/56* (2006.01)
  *F16D 121/24* (2012.01)
  *F16D 125/36* (2012.01)
  *F16D 125/40* (2012.01)

(52) U.S. Cl.
  CPC ......... *F16D 65/183* (2013.01); *F16D 65/567* (2013.01); *F16D 2121/24* (2013.01); *F16D 2125/36* (2013.01); *F16D 2125/40* (2013.01)

(56) References Cited

U.S. PATENT DOCUMENTS

| | | | | |
|---|---|---|---|---|
| 3,900,084 A * | 8/1975 | Farr | | F16D 65/567 188/71.9 |
| 5,000,294 A * | 3/1991 | Hunnicutt | | F16D 65/18 188/71.9 |
| 5,038,895 A | 8/1991 | Evans | | |
| 6,264,011 B1 * | 7/2001 | Zernickel | | F16D 65/18 188/71.9 |
| 6,311,807 B1 * | 11/2001 | Rinsma | | F16D 65/567 188/71.9 |
| 6,971,484 B2 * | 12/2005 | Sekiguchi | | F16D 65/18 188/72.7 |
| 8,220,594 B2 * | 7/2012 | Tsuruta | | F16D 65/14 188/71.9 |
| 11,649,866 B2 * | 5/2023 | Tarandek | | F16D 55/226 188/71.9 |
| 12,049,207 B2 * | 7/2024 | Kim | | B60T 13/148 |
| 2007/0045062 A1 * | 3/2007 | Watada | | F16D 65/567 188/72.8 |
| 2015/0323026 A1 * | 11/2015 | Yasui | | F16H 25/186 74/89 |
| 2016/0032994 A1 * | 2/2016 | Sakashita | | F16D 55/225 188/72.3 |
| 2017/0144642 A1 * | 5/2017 | Kim | | B60T 8/4081 |
| 2017/0144644 A1 * | 5/2017 | Kim | | B60T 8/4081 |
| 2018/0087590 A1 * | 3/2018 | Chelaidite | | F16D 55/226 |
| 2019/0118790 A1 * | 4/2019 | Severinsson | | B60T 13/746 |
| 2021/0108690 A1 * | 4/2021 | Önnestam | | F16D 65/567 |
| 2022/0260125 A1 * | 8/2022 | Tarandek | | B60T 1/065 |

FOREIGN PATENT DOCUMENTS

| | | | |
|---|---|---|---|
| DE | 102014002484 A1 | 8/2015 | |
| FR | 2638214 A1 | 4/1990 | |

OTHER PUBLICATIONS

European Patent and Trademark Office, International Search Report and Written Opinion in Application No. PCT/IB2021/053826, dated Sep. 23, 2021, 8 pages, Rijswikj, Netherlands.

* cited by examiner

ACTUATING DEVICE FOR A BRAKE DISC

CROSS-REFERENCE TO RELATED APPLICATIONS

This application is a National Phase Application of PCT International Application No. PCT/IB2021/053826, having an International Filing Date of May 6, 2021 which claims priority to Italian Application No. 102020000010954 filed May 14, 2020, each of which is hereby incorporated by reference in its entirety.

DESCRIPTION

Field

The present invention relates to an actuating device for a disc brake, in particular for an electromechanical disc brake, as well as to a disc brake provided with such an actuating device.

Background

Actuating devices for disc brakes comprising a gear motor associated with a ball screw, which converts the torque generated by the gear motor into a linear braking force directed against the disc brake pads are known.

The ball screw performs two functions in these actuating devices. The first function is to transmit braking force to the disc brake pad so that the pad applies a braking torque to the disc brake. The second function is to recover, compensate for, the pad wear.

Although ball screw actuators are suitable for transferring braking load to the disc brake pads and compensating for wear, they have several drawbacks.

Indeed, these actuating devices have a high axial dimension, i.e., in the direction of application of the braking force, as well as high costs, noise and weight.

Another drawback of the ball screw actuators is determined by the impossibility of defining non-linear advancement laws. Indeed, the ball screws have a constant screw pitch and, therefore, a linear advancement law directly proportional to the rotation angle of the screw.

On the other hand, it would be desirable to have an actuating device with a non-linear advancement more adapted to the distinct steps of approaching the piston until the piston-pad-disc contact is achieved and of tightening the piston to clamp the pads against the brake disc.

A further known actuating device is the so-called "ball-in-ramp" mechanism. A ball-in-ramp mechanism is also a mechanism for converting a rotational motion into a translatory motion and comprises two mutually rotatable facing components and a plurality of balls interposed in contact between the two facing components and received within rolling tracks (or ramps) formed in the two components. The rolling tracks have a helical development so that the relative rotation between the two facing components results in a wedge effect and their axial translation away from each other.

Ball-in-ramp mechanisms have much smaller axial dimensions than the ball screws, can generate very high either linear or non-linear braking forces (according to the conformation of the ball ramp tracks) according to the relative rotation angle of the two facing components.

However, known ball-in-ramp mechanisms have the drawback of very limited axial travel, which makes it difficult to recover the wear of the disc brake pads.

SUMMARY

It is the object of the present invention to provide an actuating device for disc brake having such features as to avoid at least some of the drawbacks of the prior art.

It is a particular object of the present invention to provide an actuating device for disc brake having small axial dimensions and low cost and weight, with the braking efficiency being the same or improved.

It is a further particular object of the present invention to provide an actuating device for disc brake configurable with non-linear advancement laws.

It is a further object of the invention to reconcile the apparently conflicting requirements of a small axial dimension, which is currently incompatible with the use of a screw motion converter, and of an extra-travel of the piston to recover the pad wear, which is currently incompatible with the use of a ramp-ball system.

These and other objects are achieved by an actuating device for disc brake according to the claims.

The dependent claims relate to preferred and advantageous embodiments of the invention.

DESCRIPTION OF THE DRAWINGS

In order to better understand the invention and appreciate the advantages thereof, some non-limiting exemplary embodiments thereof will be described below with reference to the accompanying drawings, in which.

Figure 7:
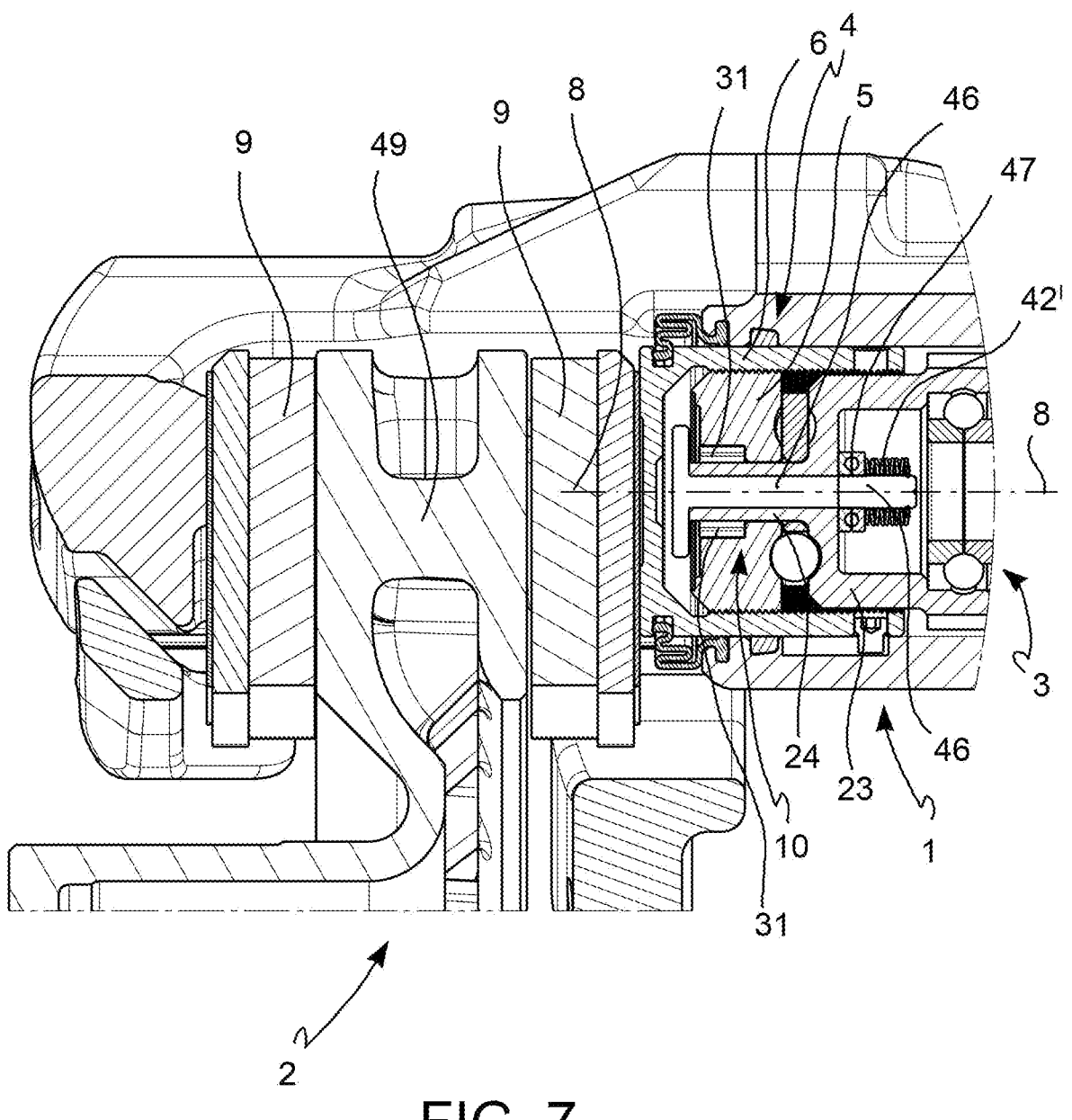
Figure 8:
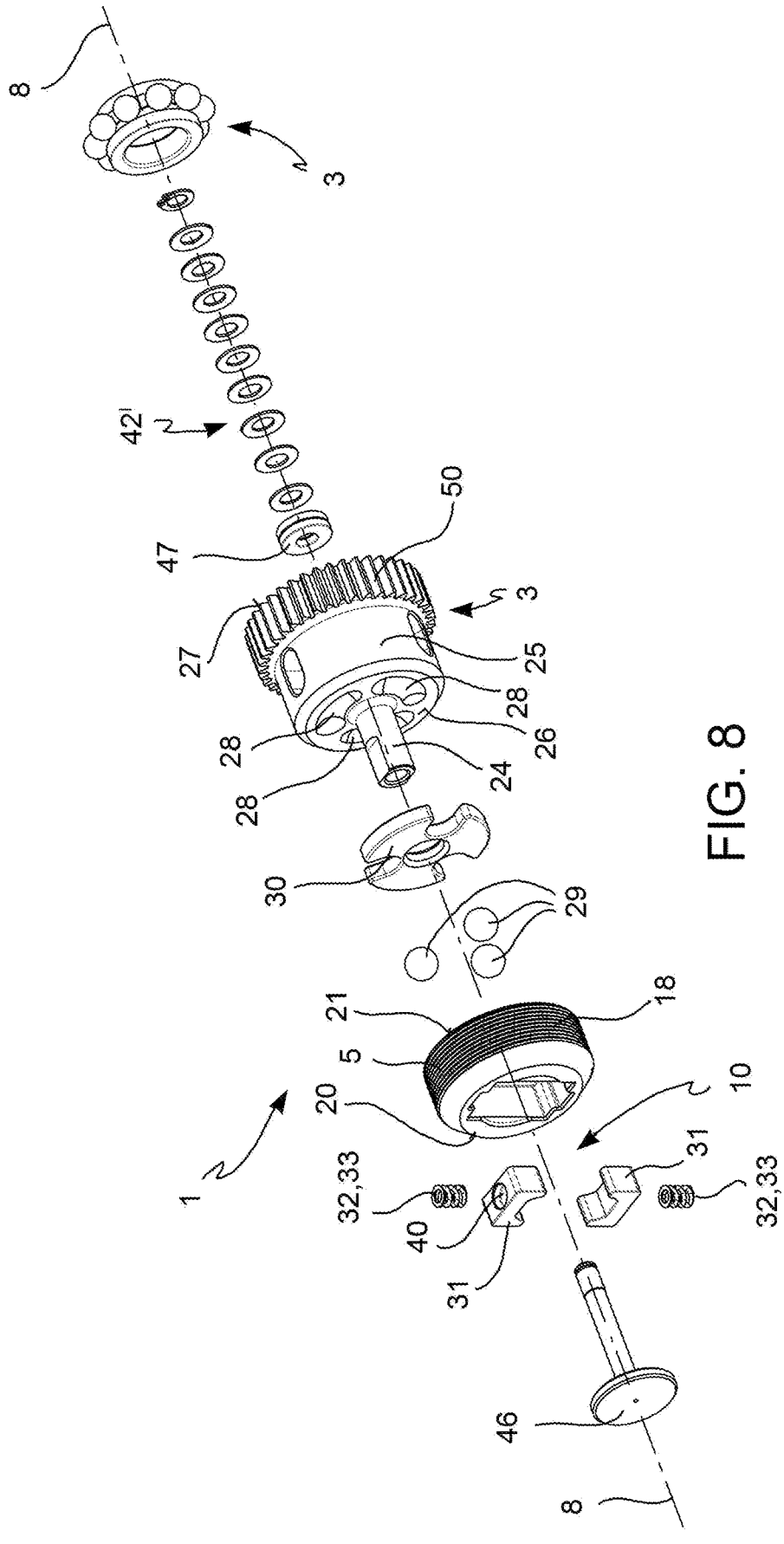
Figure 8A:
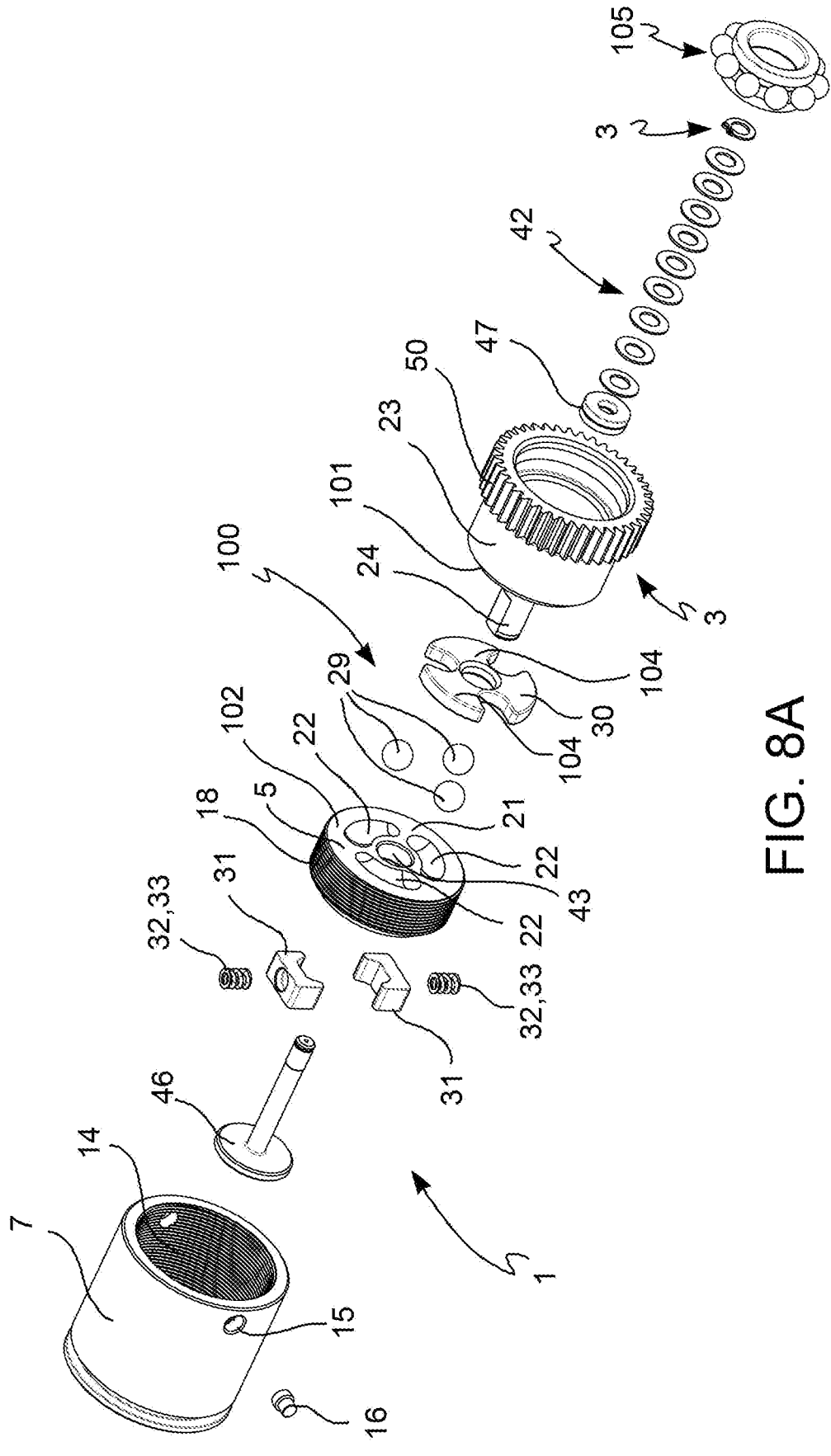
Figure 9:
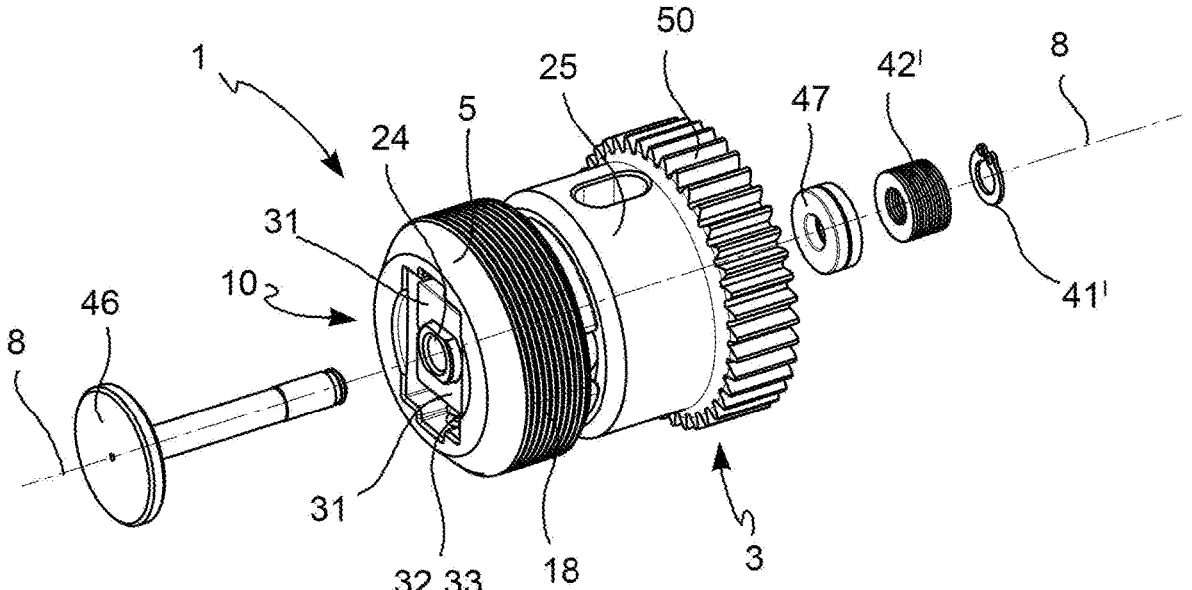
Figure 10:
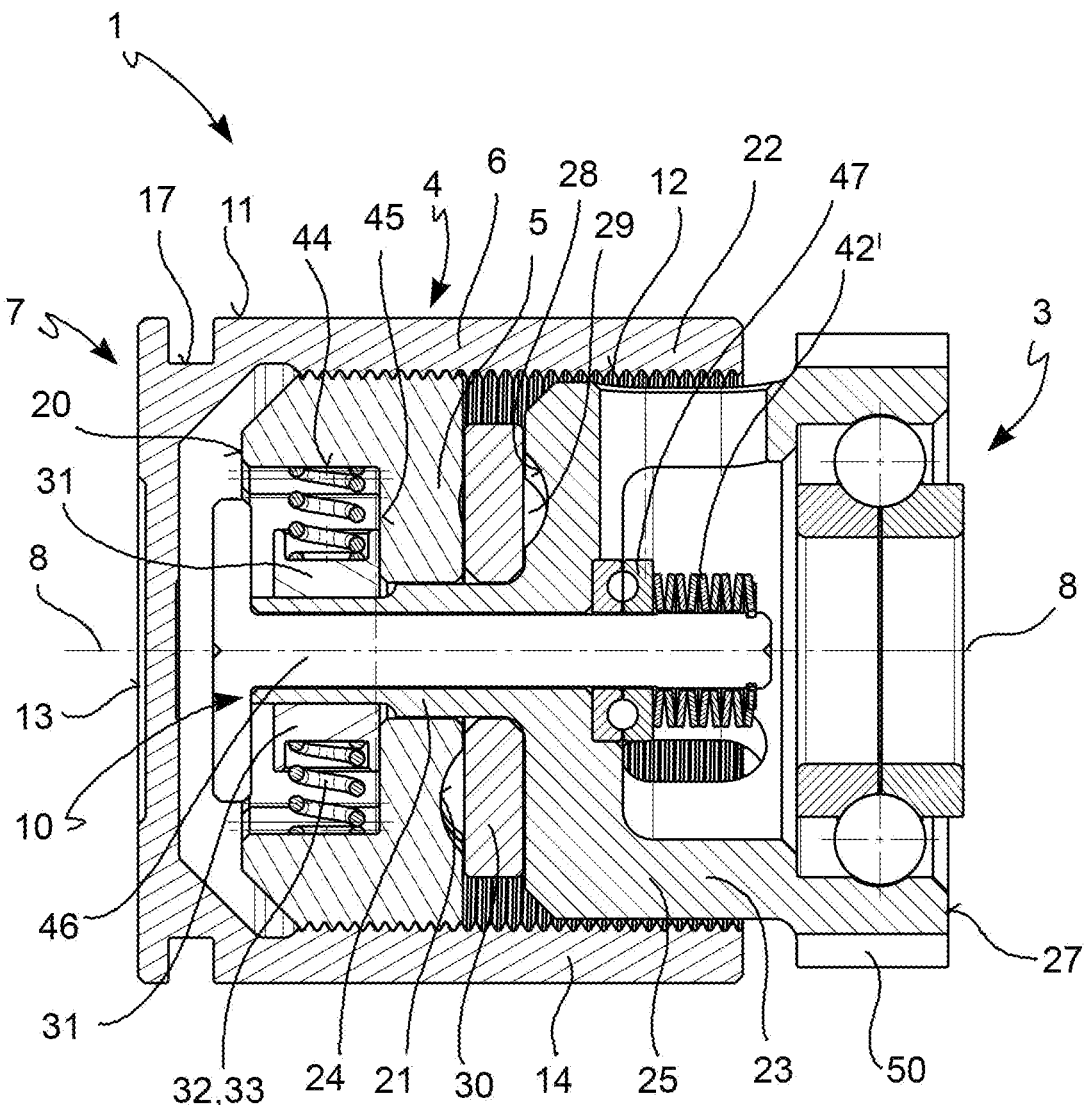
Figure 10A:
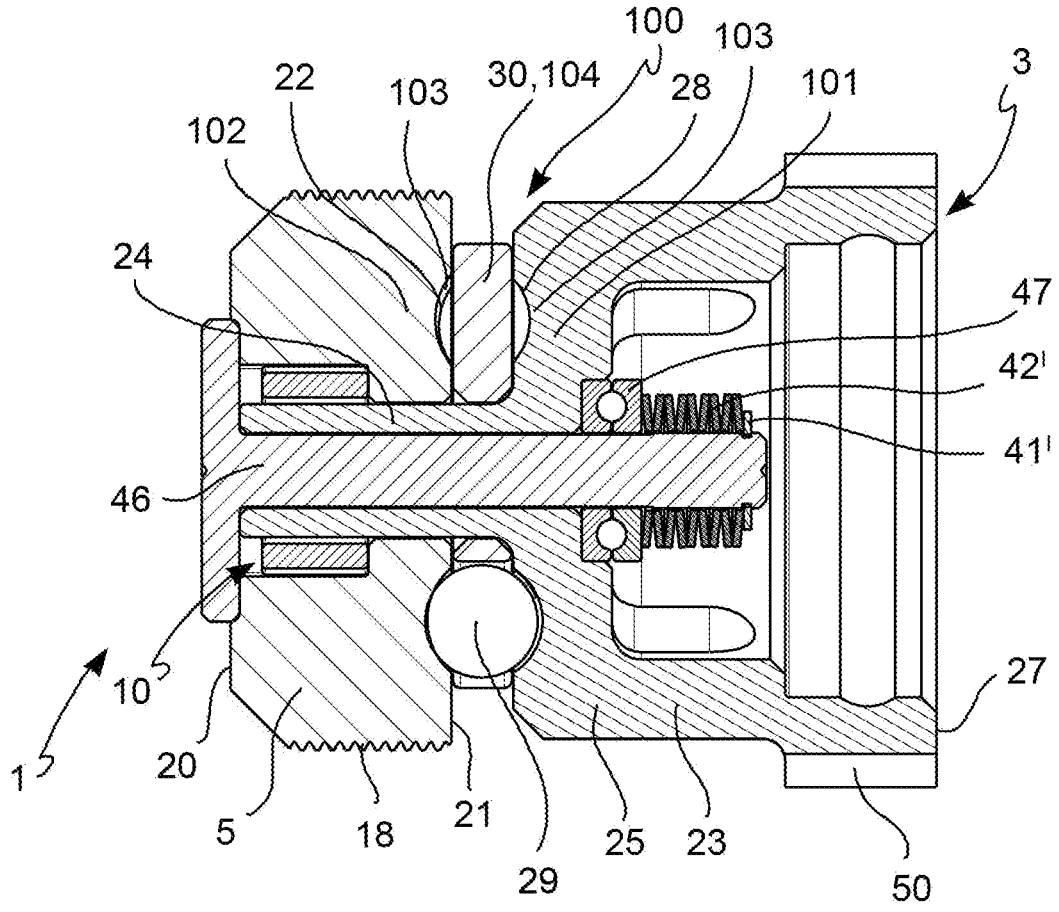

view 6A is a sectional view orthogonal to an actuating axis, in a first operating configuration;

view 6B is a section view orthogonal to an actuating axis, in a second operating configuration;

FIG. 7 is a section view taken along a radial plane of a detail of a disc brake according to a further embodiment of the invention;

FIG. 8 is an exploded view of an actuating device for disc brake according to a further embodiment of the invention;

FIG. 8A is a further exploded view of the actuating device for disc brake shown in FIG. 8;

FIG. 9 is a perspective view of an actuating device for disc brake partially assembled according to a further embodiment of the invention;

FIG. 10 is a radial section view of the assembled actuating device in FIG. 9;

FIG. 10A is a radial section view of an actuating device for disc brake according to an embodiment of the invention;

3

Figures 11A, 11B:
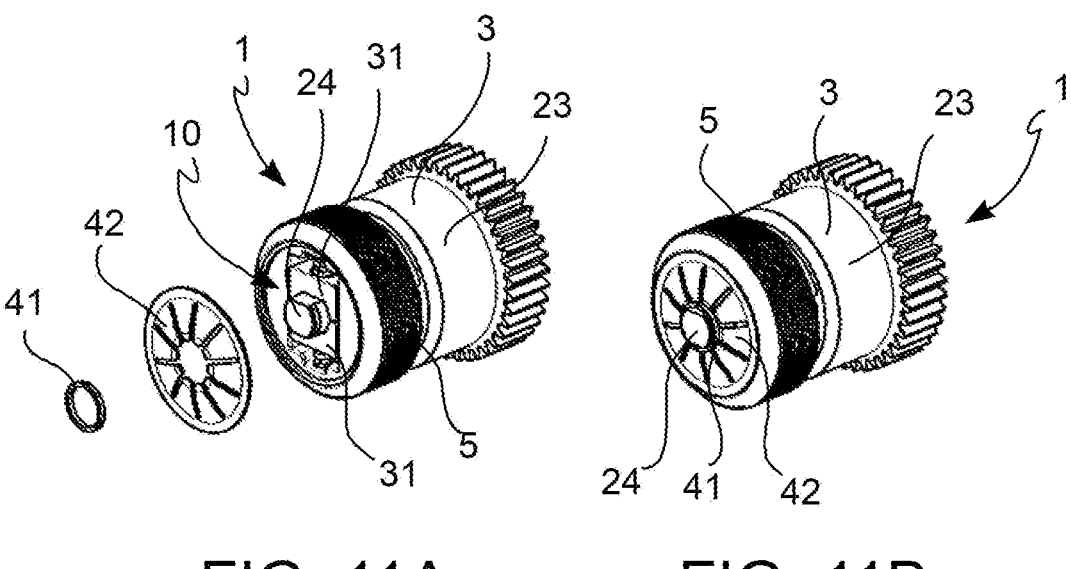
Figure 12:
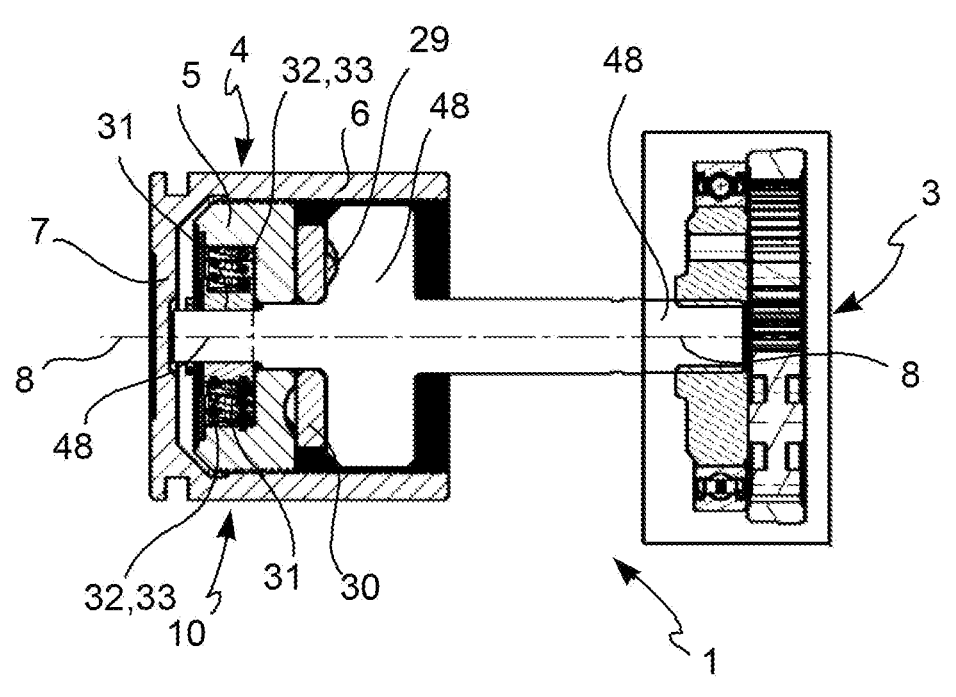
Figure 13A:
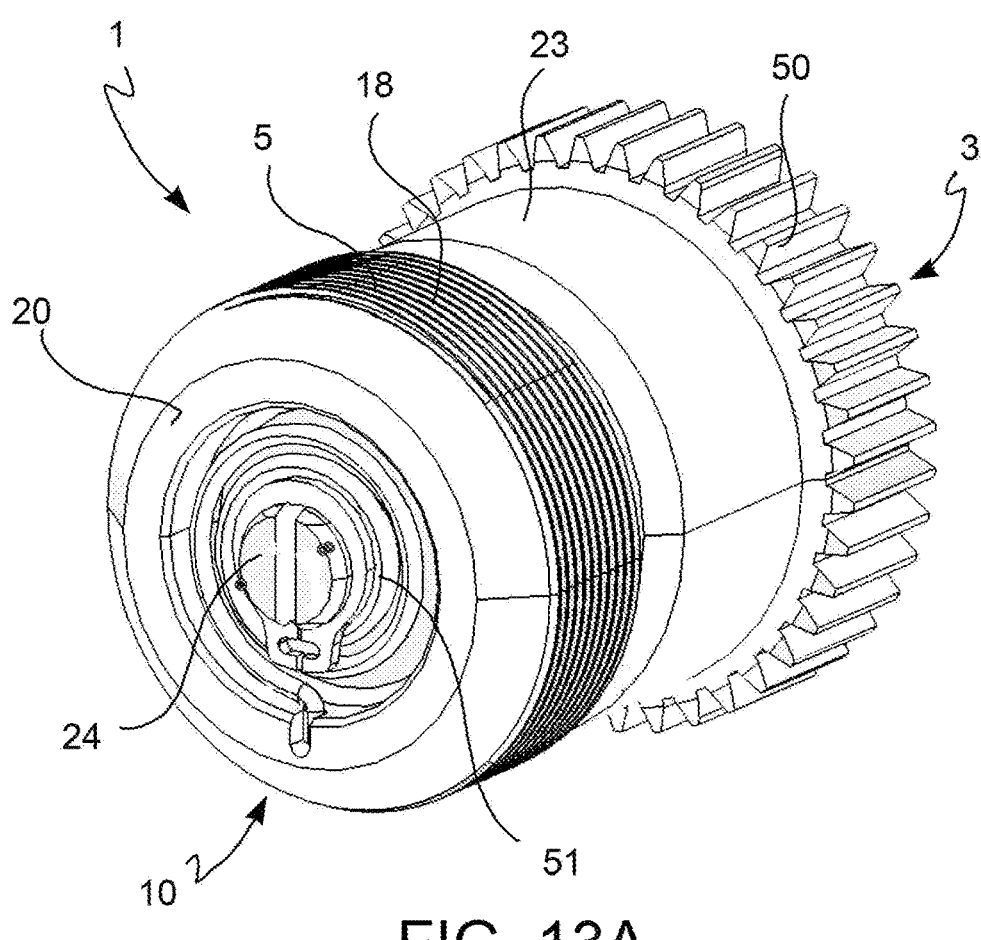
Figure 13B:
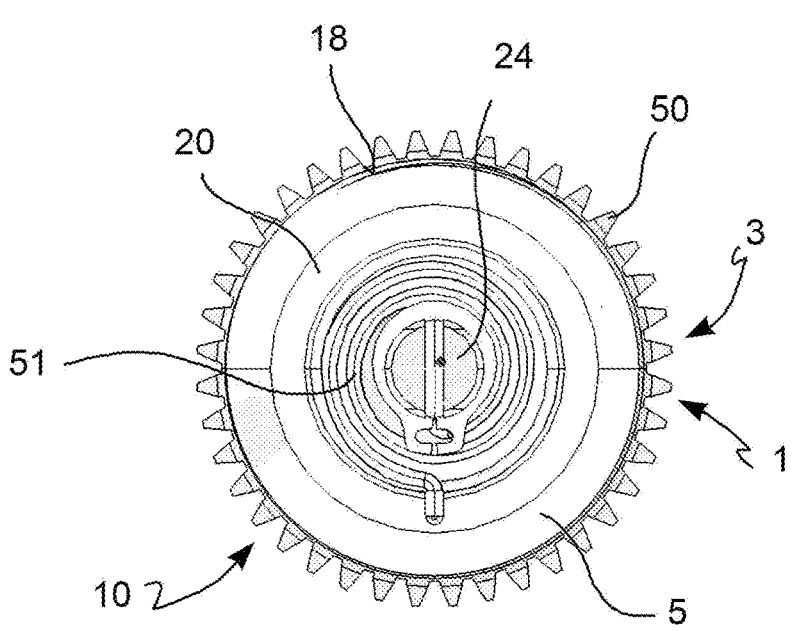

FIG. 11A is a perspective view of an actuating device for disc brake partially assembled according to an embodiment of the invention;

FIG. 11B is a perspective view of the assembled actuating device for disc brake in FIG. 11A;

FIG. 12 is a radial section view of an actuating device for disc brake according to a further embodiment;

FIG. 13A is a perspective view of an actuating system according to a further embodiment of the invention;

FIG. 13B is a front view of the actuating device in FIG. 13A.

DETAILED DESCRIPTION

In the following description, the term "front" orientation relates to the orientation of sides, faces, surfaces, etc. in the direction of advancement (braking) of the piston, the term "rear" orientation relates to the orientation of sides, faces, surfaces, etc. in the retraction direction of the piston, unless otherwise specified. The terms "radial", "circumferential", "axial" are intended with respect to the actuating axis of the piston, unless otherwise specified.

With reference to the figures, an actuating device 1 for a disc brake 2, comprises:

a piston 7 slidingly supported along an actuating axis 8, a first ramp-ball motion converter 100, having a first ramp portion 101 axially stationary and actuatable in rotation around the actuating axis 8, a second ramp portion 102 coupled to the piston and facing the first ramp portion 101, and a plurality of rolling elements (balls) 29 interposed in contact between ramp tracks 103 formed by the first 101 and second ramp portion 102, so that the rotation of the first ramp portion 101 with respect to the second ramp portion 102 brings about a braking translation of the second ramp portion 102 together with the piston 7 with respect to the first ramp portion 101, along the actuating axis 8, a second screw and nut motion converter 4 without ball recirculation, connected between the second ramp portion 102 and the piston 7, so that a rotation of the second ramp portion 102 with respect to the piston 7 about the actuating axis 8 brings about a further compensating translation of the piston 7 with respect to the second ramp portion 102, along the actuating axis 8, a torque limiter 10 (or, in other words, a torsional clutch), that:

makes a torsional connection of the first ramp portion 101 with the second ramp portion 102, so that they rotate together about the actuating axis 8 until a predetermined limit torque in said torsional connection is reached, decouples the rotation of the first ramp portion 101 with respect to the second ramp portion 102 about the actuating axis 8 when the predetermined limit torque is exceeded.

Thereby, in a first step of approaching the piston 7 to the pad until a piston-pad-brake disc engagement is achieved (the step of extra-travel required to compensate for the worn pad thickness), both ramp portions 101, 102 of the first ramp-ball motion converter 100 rotate together and advance the piston 7, by virtue of the action of only the second screw and nut motion converter 4.

At the end of the first approaching step, the piston-pad-disc brake pressing engagement increases the mechanical resistance against further advancement of the piston 7 until the predetermined limit torque is exceeded in the torsional connection between the first ramp portion 101 and the second ramp portion 102, and their relative rotation results in the braking translation of the piston 7 (for a very limited braking travel), by virtue of the action of the first ramp-ball motion converter 100 only.

The first ramp portion 101 may be connected to an input shaft or a general input rotating element 3, e.g. of a reduction gear or an electric motor.

Conventionally, the piston 7 is configured to transmit an axial force in the direction of the actuating axis 8, on a disc brake pad 9 of the disc brake 2.

Advantageously, the actuating device 1 thus configured is more compact and lighter than the actuating devices of the prior art.

Furthermore, the actuating device 1 eliminates the need for using ball screws and has small dimensions, light weight, and low cost.

Furthermore, the actuating device 1 thus configured reconciles the requirements of having a braking travel with high force and good motion reversibility, high efficiency, and an irreversible, low force travel for compensating for the wear of the pads 9.

The actuating device 1 thus configured converts a torque from the rotating element 3 into a linear force, through two distinct steps of operation. In the first step, the wear of the pads 9 of the disc brake 2 is recovered by approaching the piston 7 to the pad 9 of the disc brake 2. This movement is achieved by the second screw and nut motion converter 4 through forces which are not high, i.e. lower than the braking force. The actual braking, i.e., the generation of the braking force by the piston 7 on the pad 9 of the disc brake 2, takes place in the second step. The translatory movement of the piston 7, which generates the braking force, is generated by the second ramp-ball motion converter 100.
Detailed Description of the First Ramp-Ball Motion Converter 100

According to an embodiment of the invention, the first ramp portion 101 may itself form the input rotating element 3 of the device 1 and the second ramp portion 102 may be directly formed at a screw body 5 of the second screw and nut motion converter 4.

This increases the compactness of the actuating device 1, reducing the space requirement thereof in the direction of the actuating axis 8.

According to an advantageous embodiment, the first ramp portion 101 is formed by a rotor body 23 having a substantially cylindrical shape, with a circumferential rotor wall 25 extending in the direction of the actuating axis 8, a front rotor wall 26, and a rear rotor wall 27.

The rotor front wall 26 faces in a direction of advancement of the piston 7 and forms one or more, preferably three, first rolling tracks 28 of the ramp tracks 103, as well as a drive shaft 24, protruding from the rotor front wall 26, coaxial to the actuating axis 8, and connected to the torque limiter 10. The drive shaft 24 may further form a rotatable, centering support for the second ramp portion 102.

The circumferential rotor wall 25 may form a toothing 50 extending about the actuating axis 8, e.g. at the rear rotor wall 27, for transmitting an actuating torque/rotation.

According to an alternative embodiment (FIG. 12), the rotor body 23 is formed as a radial enlargement of a shaft 48 which forms both the axially extended drive shaft 24 in the actuating device 1 and an input shaft extended on a rear side of the rotor body 23 opposite to the drive shaft 24.

According to an embodiment, the first motion converter 100 comprises a bearing assembly 105 configured to position the first ramp portion 101, in particular the rotator body 23, stationary in translation and concentric with respect to the actuating axis 8, and to support the axial loads generated during the operation of the actuating device 1, and possibly, also the radial loads due to the engagement with the toothing 50.

Advantageously, the bearing assembly 105 is positioned inside the rotor body 23, coaxial with the rotor body 23, and possibly at the position of the toothing 50 (to directly provide a radial reaction constraint thereon).

The bearing assembly 105 may comprise a four-point contact rolling bearing.

According to an embodiment, a rear screw wall 21 of the screw body 5, facing the rotor body 23, forms at least one, preferably three, second rolling tracks 22 of the cam tracks 103.

Advantageously, a first rolling track 28 and a second rolling track 22 facing each other accommodate between them a rolling ball 29, respectively.

The ramp tracks 103 of the ramp portions 101, 102 extend helically (or, in other words, eccentrically and in a circumferential direction) with respect to the actuating axis 8. Each of the ramp portions 101, 102 may form, for example, two or three rolling tracks 103 arranged in circumferential sequence and separated from each other by separation ribs to accommodate the rolling elements (balls) 29 in their planned position.

The ramp tracks 103 may be configured as a variable pitch helix in the direction of the actuating axis 8, defining a non-linear rotation-translation conversion law.

According to an embodiment, the at least one ramp track 103 is shaped to radially restrict the movement of the ball 29.

Advantageously, this avoids the risk of the at least one ball 29 escaping from the corresponding ramp track 103.

According to an advantageous embodiment, rolling balls 29 are further contained by a containment cage 30 interposed between the first ramp portion 101 and second ramp portion 102, i.e., between the rotor body 23 and the screw body 5, advantageously (rotatably) supported on the drive shaft 24.

According to an embodiment, the containment cage 30 forms radially open or closed and enveloping vanes 104 or ball seats to prevent the rolling balls 29 from radially escaping.

According to an embodiment, the first ramp portion 101, the second ramp portion 102, and the rolling elements (balls) 29 are elastically pushed into mutual contact in the direction of the actuating axis 8.

This avoids the occurrence of ball vibrations in the ramp tracks and noise, and keeps the individual components in their planned position.

According to an embodiment (FIGS. 11A, 11B), the actuating device 1 comprises an axial preload spring 42 configured to axially push the first ramp portion 101 towards the second ramp portion 102 or, in other words, the screw body 5 against the rotor body 23. The same axial preload spring 42 may be arranged to axially preload the assembly of first motion converter 100 and torque limiter 10.

The axial preload spring 42 may be supported (e.g., through a Seeger ring 41) onto the drive shaft 24 and tightened between a free (frontal) end portion (facing in the direction of advancement of the piston 7) of the drive shaft 24 and a front wall 20 of the screw body 5, e.g. a coil spring, one or more Belleville springs in series, or a wave spring.

According to an embodiment (FIGS. 10, 10A), the drive shaft 24 (formed either in one piece or integral with the rotor body 23) forms an axial through-hole which accommodates a tie rod 46 having a mushroom-shaped or plate-shaped front end resting axially against the front wall 20 of the screw body 5 (in a direction opposite to the direction of advancement of the piston 7) and a rear end portion protruding into an internal cavity of the rotor body 23, where an axial preload spring 42', advantageously a Belleville spring, one or more Belleville springs in series, or one or more coil springs inserted on the tie rod 46, may be supported (e.g., by means of a Seeger ring 41') on the tie rod 46 and clamped between the rear end portion of the tie rod 46 and a bottom surface of the inner cavity of the rotor body 23, preferably through the interposition of a (rolling) axial bearing 47.

Advantageously, the first motion converter 100, the second motion converter 4, and the torque limiter 10 are at least partially, preferably completely, accommodated in an internal cavity of the piston 7, thus occupying the same axial space.

With further advantage, the torque limiter 10 is at least partially, preferably completely, accommodated in an internal cavity of the second motion converter 4, preferably in an internal cavity of the screw body 5, thus occupying a same axial space.

Detailed Description of the Piston 7 and the Second Screw and Nut Motion Converter 4

According to an embodiment, the piston 7 has a substantially hollow cylindrical shape concentric to the actuating axis 8, with a cylindrical wall 14 defining an outer piston surface 11 and an inner piston surface 12, a head wall 13 transverse to the side wall 14 and formed at a front end of the piston 7, and in operating conditions, facing the pad 9 of the disc brake 2.

According to a preferred embodiment, the inner piston surface 12 is threaded and screwed onto the screw body 5 to form a nut 6 of the second nut and screw motion converter 4.

According to an embodiment, the piston 7 forms anti-rotation means, e.g. one or more radial protrusions 16 slidingly accommodated in one or more corresponding guides 16' formed in the cylinder 16" and extended in the direction of the actuating axis 8, to allow an axial translation and prevent a rotation of the piston 7 with respect to the cylinder 16".

According to an embodiment, the protrusion 16 may be formed by a grub screw, preferably made of steel, inserted or screwed into a (threaded) hole 15 of the cylindrical wall 14, and oriented in a radial direction with respect to the actuating axis 8.

By preventing the rotation of the piston 7 about the actuating axis 8 and a translation of the screw 5 in the direction of the actuating axis 8, a rotation of the screw body 5 screwed into the internal thread of the piston 7 results in a translation of the piston 7 along the actuating axis 8.

According to an embodiment, the cylindrical wall 14 may form on the side of the head wall 13 a circumferential groove 17 adapted to accommodate a dust seal.

According to a preferred embodiment, the screw body 5 forms:
a cylindrical side wall 18, concentric with respect to the actuating axis 8, with an outer thread to be screwed with the inner thread of the piston 7,
a front screw wall 20 facing in the direction of advancement of the piston 7 and a rear screw wall 21 opposite to the front screw wall 20,
a coupling seat 19 preferably positioned radially and axially on the inside with respect to the outer thread and which accommodates the torque limiter 10.
This configuration contributes to a further reduction in the axial dimensions of the device 1.

According to an embodiment, the rear screw wall 21 forms a through-hole 43 leading into the coupling seat 19, through which the drive shaft 24 extends into the coupling seat 19.

The through-hole 43 forms a centered and rotatable support of the screw body 5 with respect to the rotor body 23.

A circumferential edge between the threaded side wall 18 and the screw front wall 20 is chamfered to facilitate the insertion and screwing of the screw body 5 into the nut 6 formed by the piston 7.

Detailed Description of the Torque Limiter 10

According to an embodiment, the torque limiter 10 comprises one or more, preferably two, jaws 31 integrally coupled in rotation to the screw body 5 and elastically biased in engagement with the drive shaft 24.

According to an embodiment, the coupling seat 19 forms two abutment surfaces 44 which are diametrically opposite to each other with respect to the actuating axis 8 and two lateral guiding surfaces 44'. The jaws 31 (which may consist of slides) are accommodated between the side guiding surfaces 44' and guided radially to the actuating axis 8. Preloaded elastic elements 32, e.g. compression springs 33, are arranged between the abutment surfaces 44 and the jaws 31.

The jaws 31 and a torsional engagement portion of the drive shaft 24 are shaped to form a rotationally integral fit by interference (with elastic preload).

In particular, the torsional engagement portion of the drive shaft 24 may have two flat and parallel opposite faces 38, while the jaws 31 may form trapezoid-shaped coupling surfaces 34 facing the drive shaft 24 (FIGS. 8, 8A).

When the transmitted torque is lower than the limiting torsional moment, the drive shaft 24 is engaged between the jaws 31 and the jaws 31 are integrally rotatable with the drive shaft 24.

When the limiting torsional moment is exceeded, the drive shaft 24 spreads the jaws away from each other against the elastic force of the compression springs 33, thus allowing a relative rotation of the rotor body 23 with respect to the screw body 5.

The torque limiter 10 thus configured has a simple structure for easy maintenance and replacement of the worn jaws 31, if required.

Advantageously, the torque limiter 10 comprises two jaws 31 positioned mutually opposite with respect to the drive shaft 24.

According to an embodiment, each jaw 31 forms a coupling surface 34 facing the drive shaft 24, and a biasing surface 35 against which the spring element 32, which biases the jaw 31 against the drive shaft 24, acts.

Advantageously, the biasing surface 35 forms a seat 40 for accommodating an end of the elastic element 32.

According to a further embodiment, the coupling surface 34 comprises a substantially planar central surface 36 arranged between two walls or containment surfaces 37 either extending transversely or inclined with respect to the biasing surface 35 so that the coupling surface 34 is shaped in the form of a trapezoidal or polygonal open channel.

According to an embodiment, the coupling portion of the drive shaft 24 forms two substantially planar contrast surfaces 38 arranged between two opposite curved cylindrical or ellipsoidal segment surfaces 39.

Advantageously, a transition region between the contrast surfaces 38 and the curved surfaces 39 of the shaft 24 is joined (lacking an inner angle) or chamfered so as to decrease the localized contact pressure and thus the wear on the surfaces. Furthermore, this allows to make the jaws 31 of a material which is less hard than the material of the shaft 24.

In an engagement configuration between the drive shaft 24 and the jaws 31, the central surface 36 of the jaws 31 is in contact against the corresponding contrast surface 38 of the drive shaft 24, and the containment walls or surfaces 37 of the jaws 31 embrace the drive shaft 24 at the curved surfaces 39.

An unintentional escape of the jaws 31 from the coupling seat 19 in an axial direction is prevented by the mushroom-shaped head front end of the tie rod 46 (FIG. 10) or the spring 42 (FIGS. 11A, 11B) which at least partially occludes the outward passage by keeping the jaws 31 in the space between the mushroom-shaped head or the spring 42 and an abutment wall 45 formed within the screw body 5.

Figure 1:
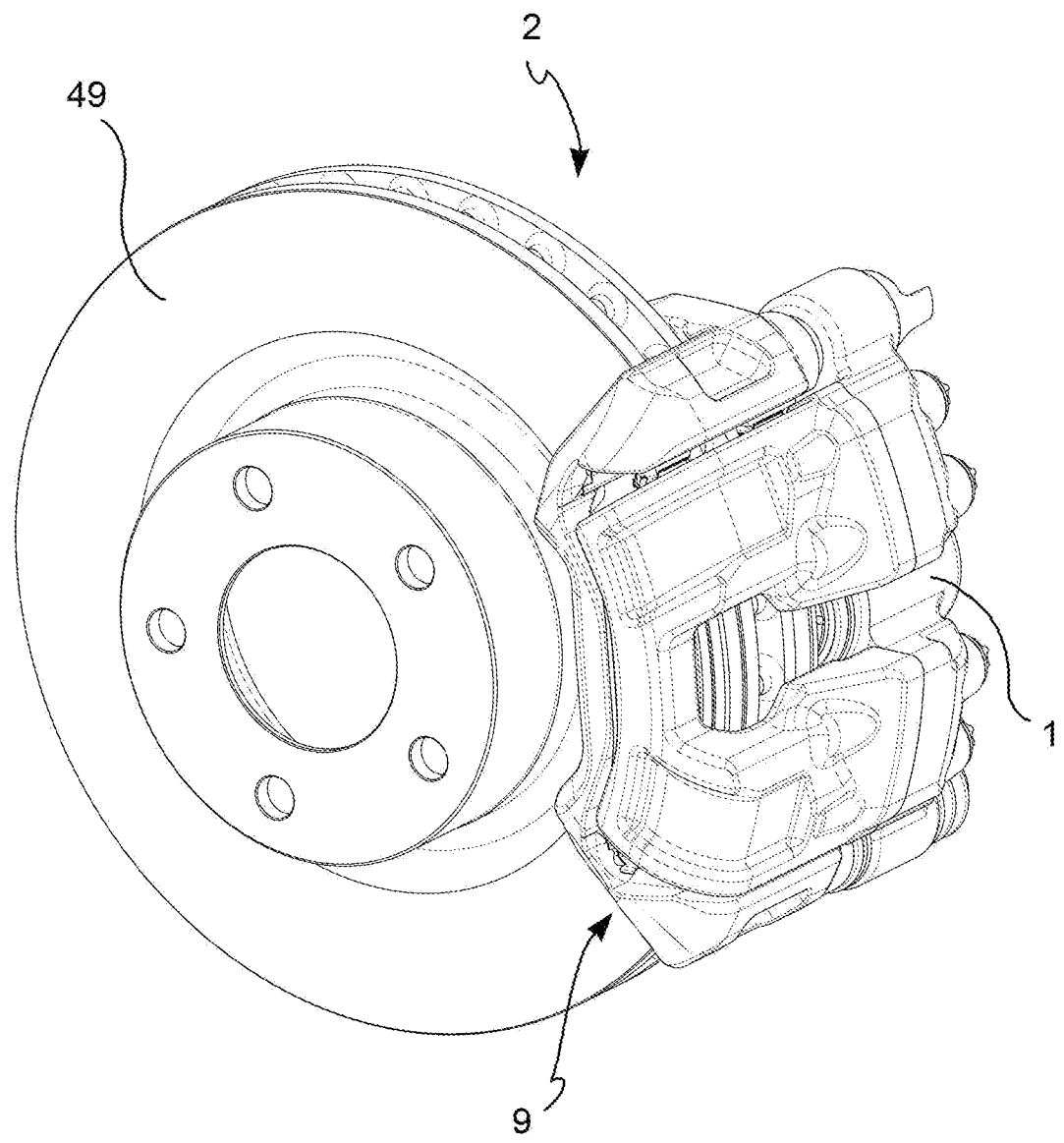
FIG. 1 is a perspective view of a disc brake according to an embodiment of the invention.
Figure 2:
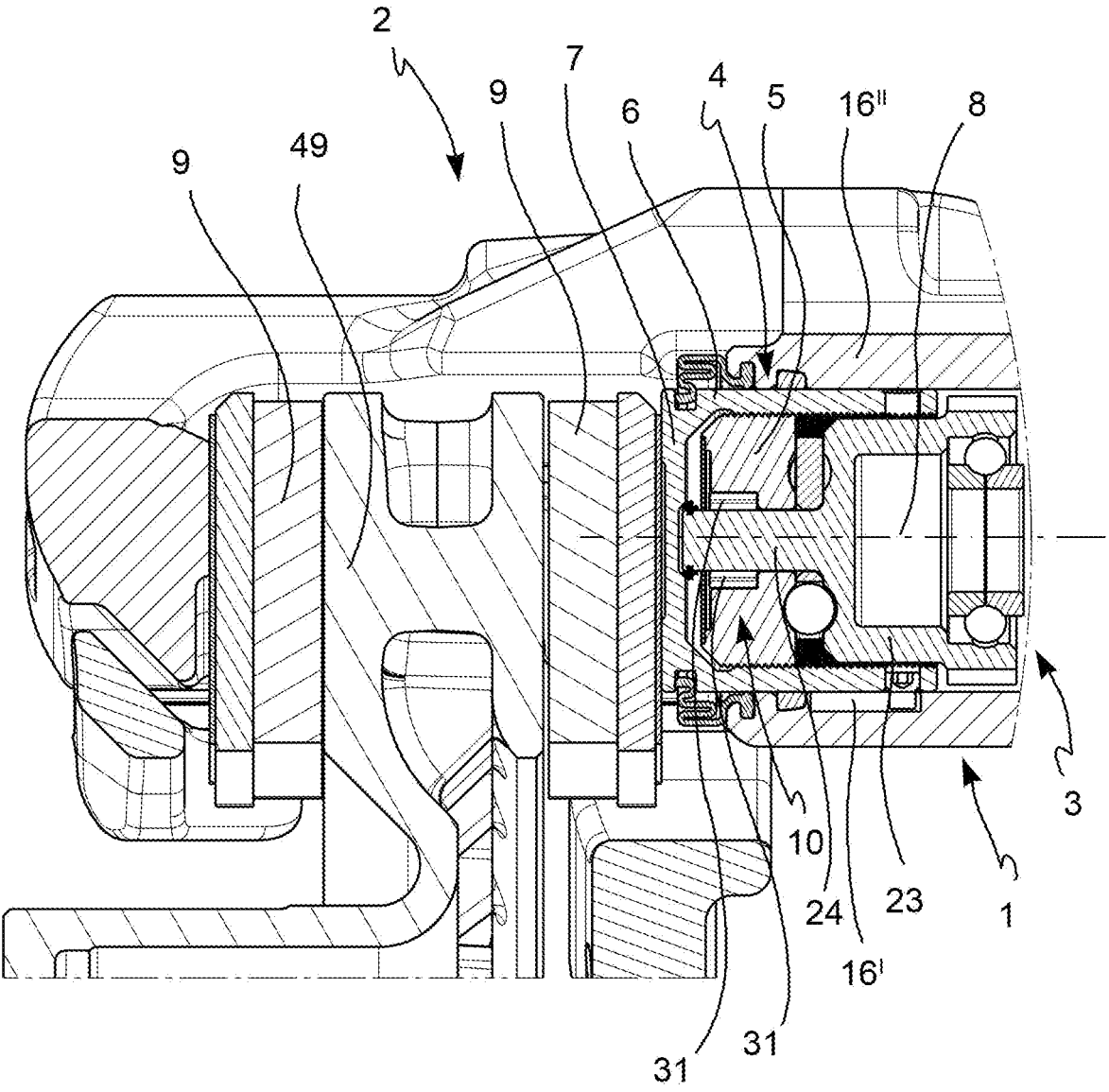
FIG. 2 is a section view taken along a radial plane of a detail of a disc brake according to an embodiment of the invention.
Figure 3:
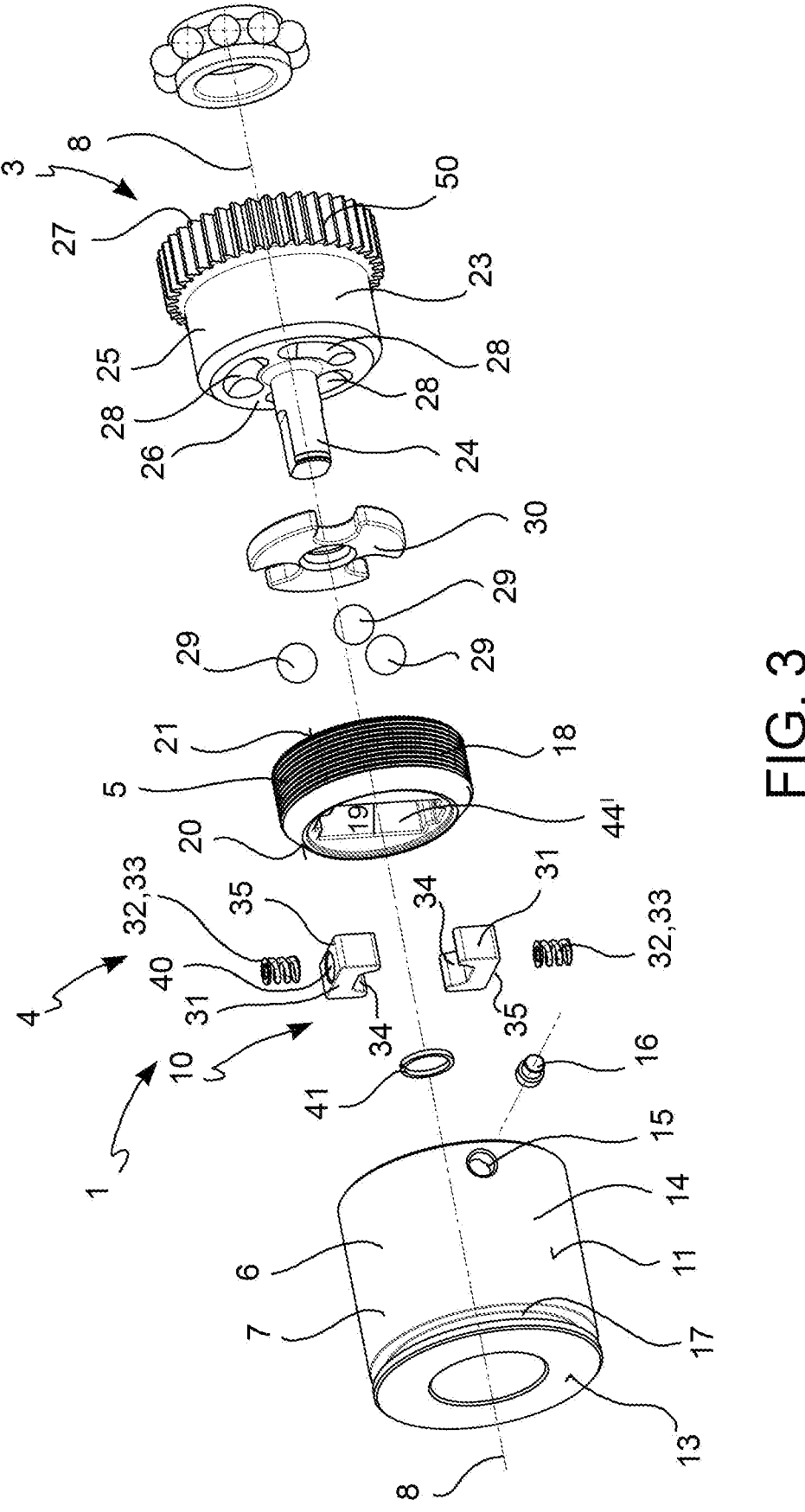
FIG. 3 is an exploded view of an actuating device for disc brake according to an embodiment of the invention.
Figure 4A:
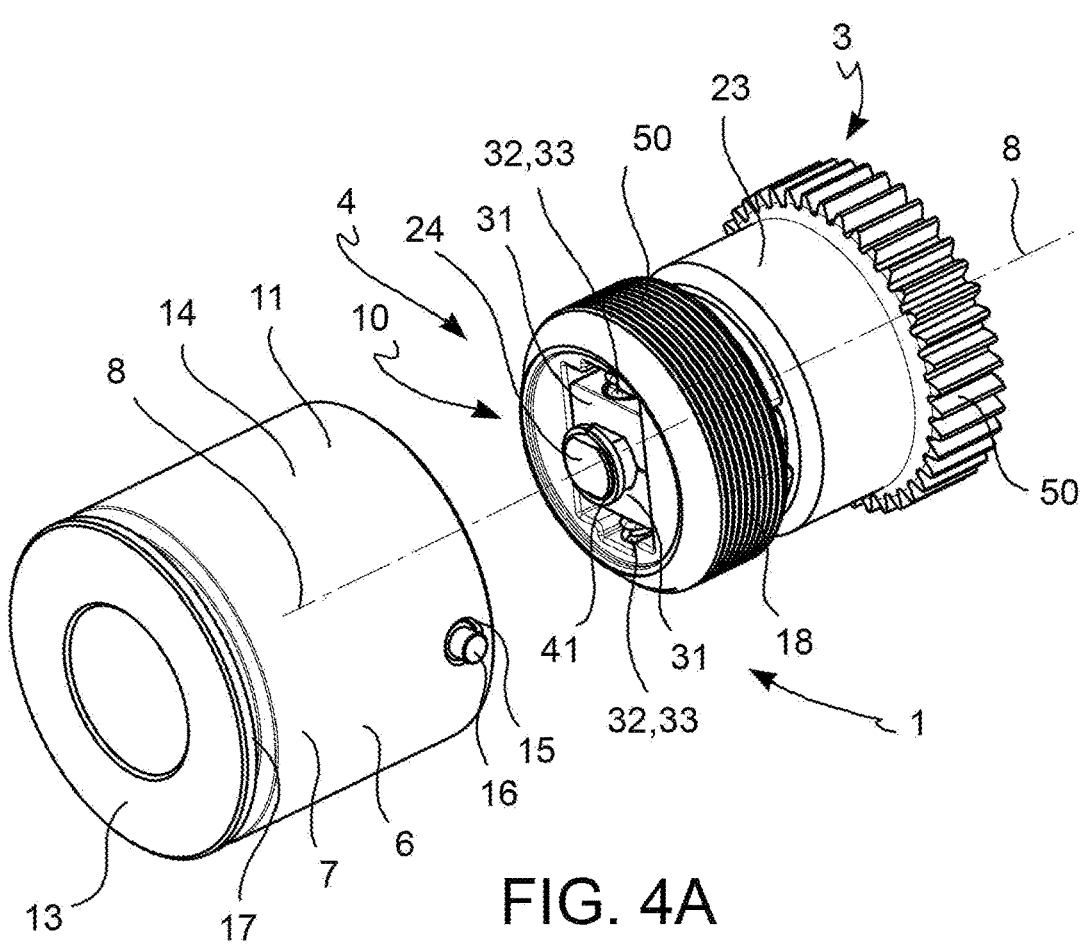
FIG. 4A is a perspective view of an actuating device for disc brake partially assembled according to an embodiment of the invention.
Figure 4B:
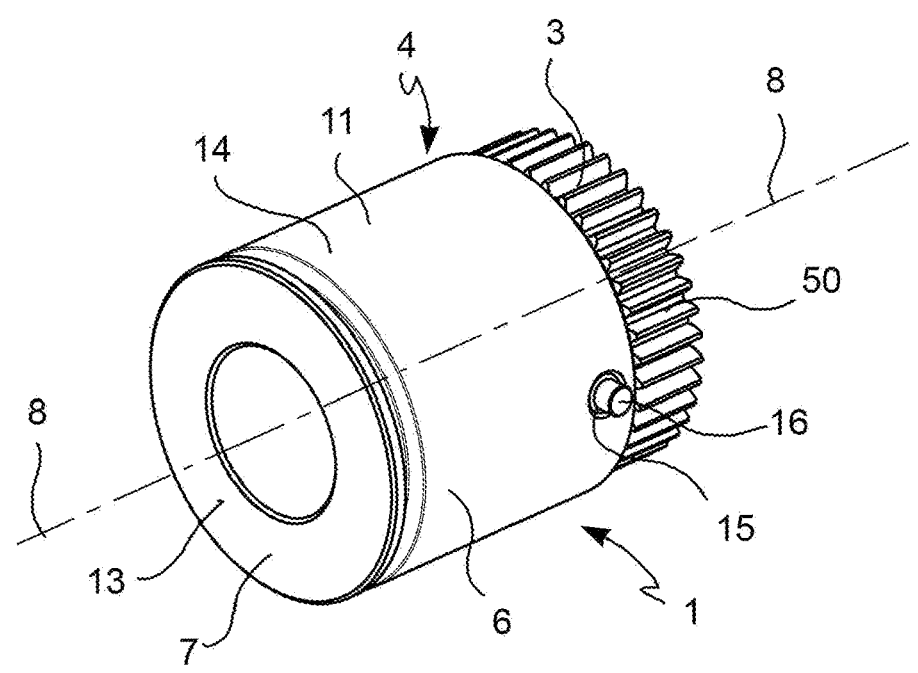
FIG. 4B is a perspective view of the assembled actuating device for disc brake in FIG. 4A.
Figure 5:
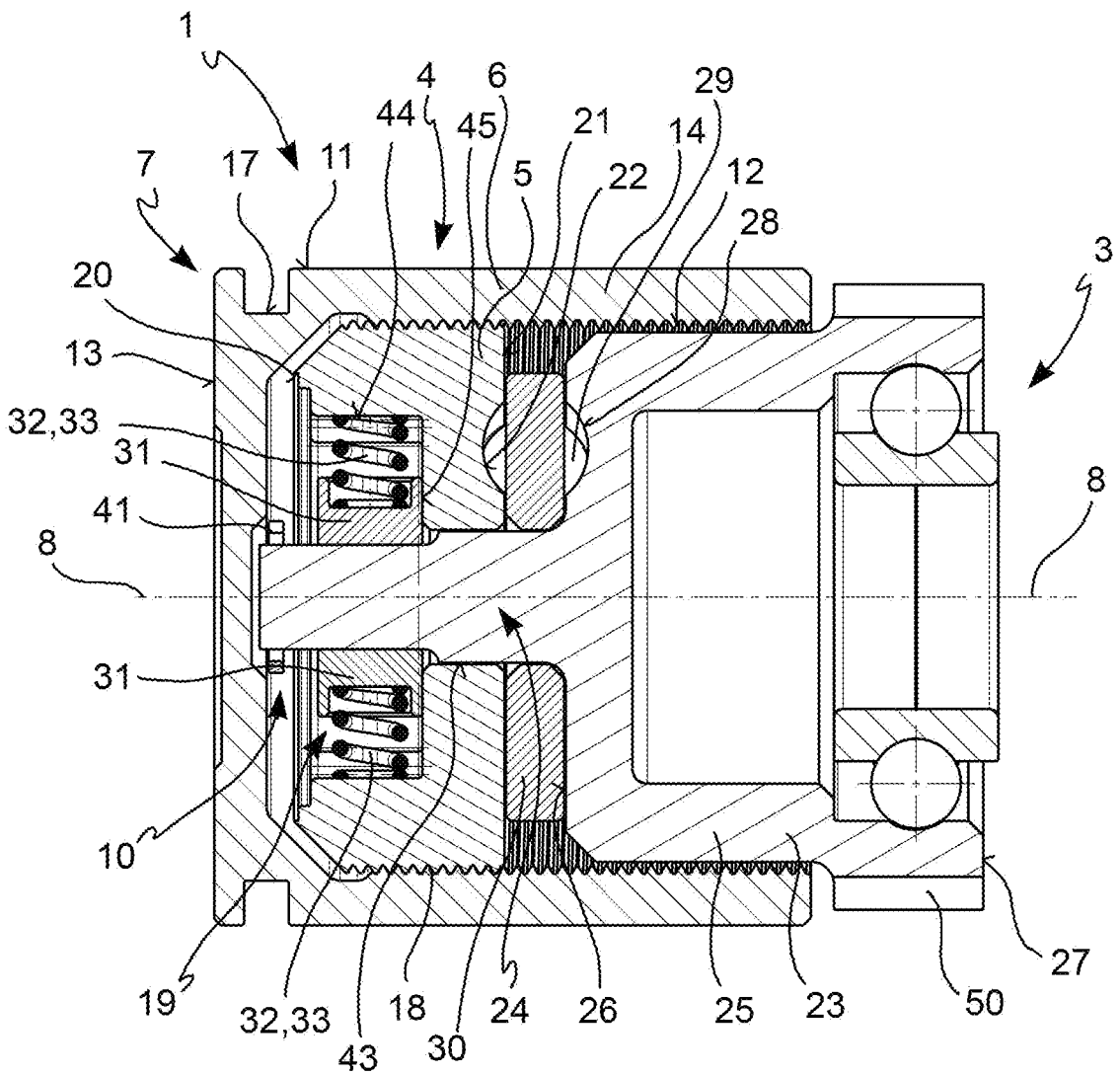
FIG. 5 is a radial section view of the actuating device in FIG. 4B.
Figure 5A:
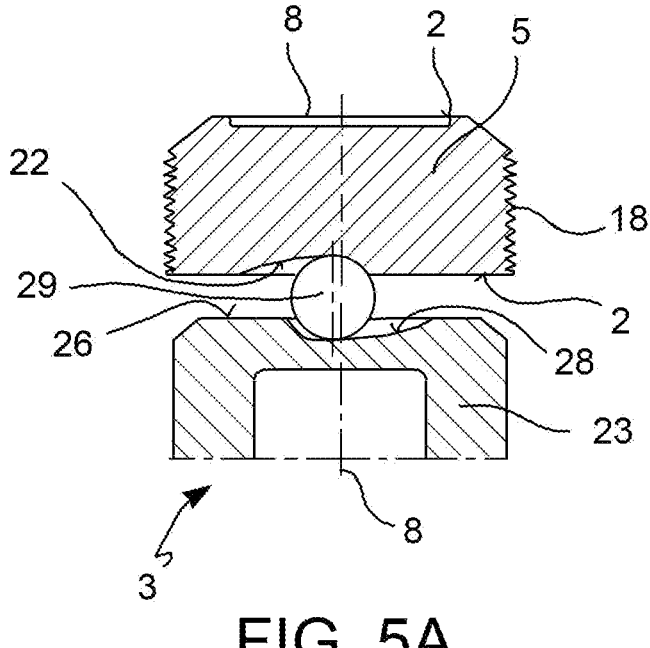
FIG. 5A is a particular view of an actuating device, according to an embodiment of the invention.
Figure 5B:
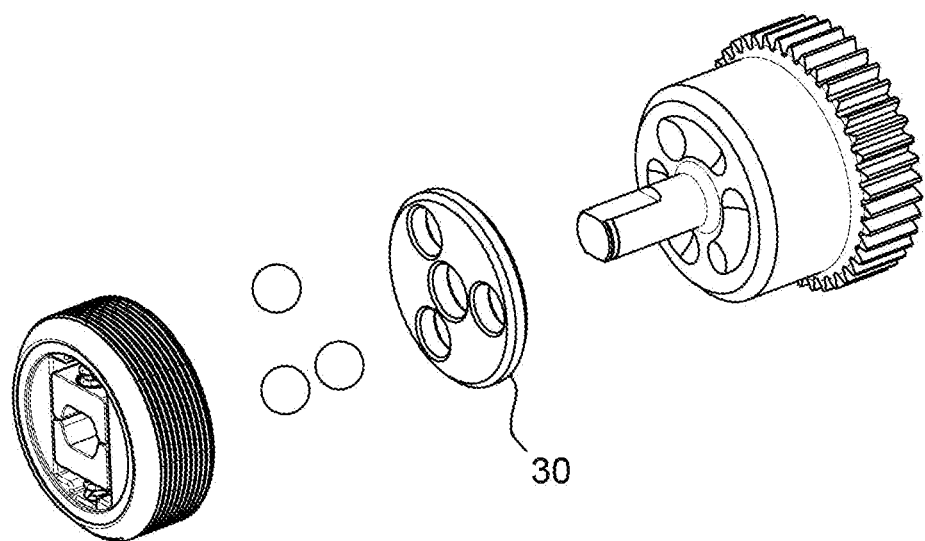
FIG. 5B is an exploded view of a detail of the actuating device according to an alternative embodiment to that in FIG. 3.
Figure 6A:
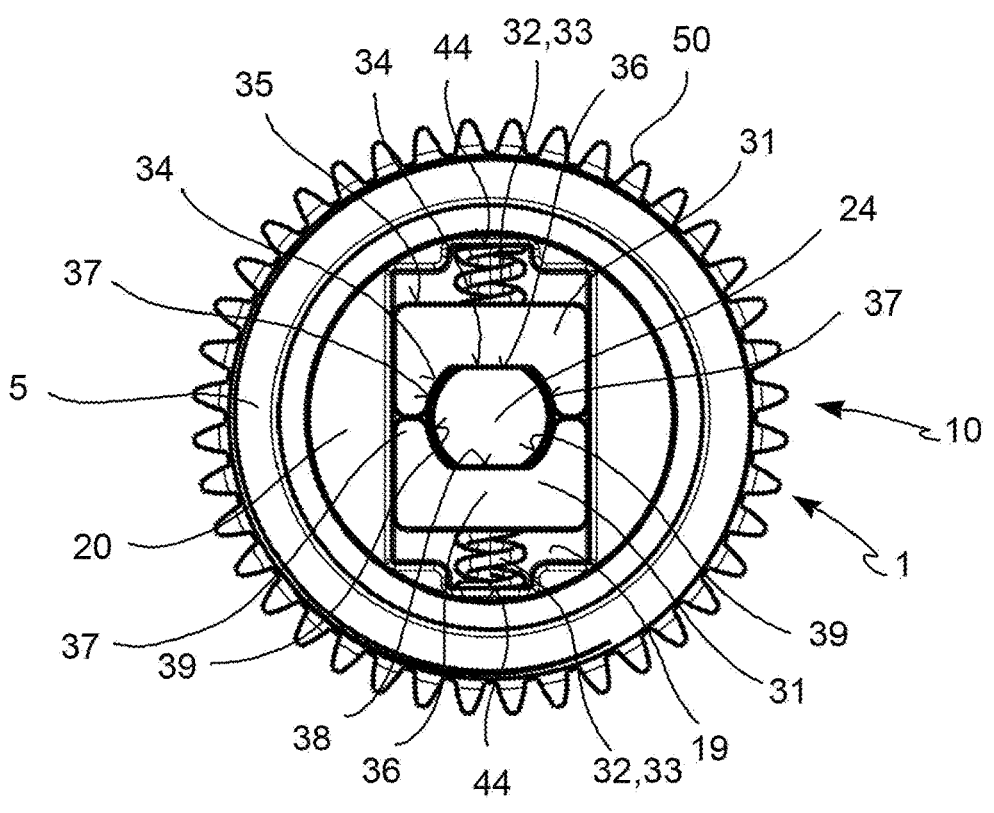
Figure 6B:
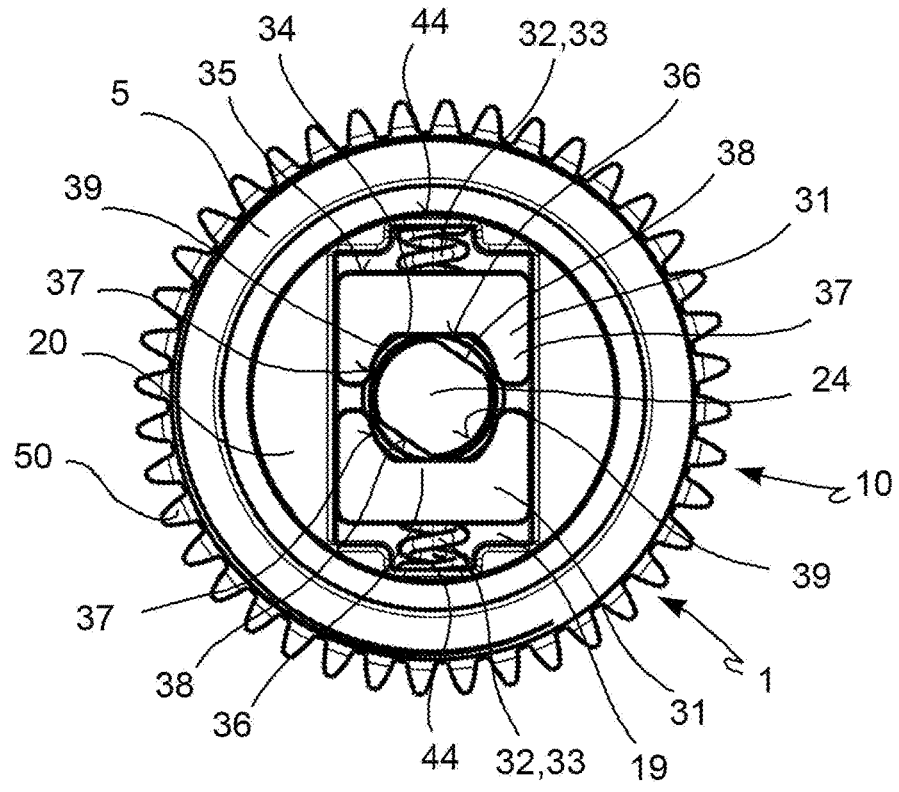

According to an embodiment (FIG. 3), the actuating device 1 comprises a retaining ring 41 (e.g., a steel Seeger ring) fixed to the drive shaft 24 to retain the jaws 31 between the retaining ring 41 and the abutment wall 45 of the screw body 5, preventing a release of the jaws 31 from the coupling seat 19.

According to an alternative embodiment (FIGS. 13A, 13B), the torque limiter 10 comprises a torsional spring 51, e.g. a coil spring connected between the first ramp portion 101 and the second ramp portion 102 of the first motion converter 100.

The moment-deformation curve of the torsion spring 51 is chosen so that, below the predetermined limit torque, the flat coil spring 51 substantially couples integrally in rotation the first ramp portion 101 and the second ramp portion 102, while above the predetermined limit torque, the torsion spring 51 is progressively deformed allowing a relative rotation of the first ramp portion 101 with respect to the second ramp portion 102.

According to an embodiment, a first end of the torsion spring 51 is integrally connected to the rotor body 23, in particular to the drive shaft 24, and the second end of the torsion spring 51 is integrally connected to the screw body 5.

According to an embodiment, the predetermined limit torque is between 800 Nmm and 400 Nmm, preferably between 690 Nmm and 490 Nmm, even more preferably between 640 Nmm and 540 Nmm, and even more preferably the predetermined limiting torque is 590 Nmm.

Advantageously, the predetermined limit torque of this amount prevents the occurrence of phenomena of instability or irregularity of the braking torque produced by the disc brake 2.

Description of the Disc Brake 2

A disc brake 2 comprises, in a known manner, a caliper comprising two spaced apart side walls which delimit a disc space to accommodate a brake disc portion, means for fixing the caliper to a vehicle, a connecting structure which extends straddling the disc space and connects the side walls to each other, at least one pad seat formed in each of said side walls and adapted to accommodate at least one friction pad, thrust means constrained to one or both side walls and adapted to bias the friction pads against the brake disc to clamp it, where, according to the present invention, the thrust means comprise the actuating device 1 described hereto.

What is claimed is:

1. An actuating device for a brake disc, comprising:
   a piston slidingly supported along an actuating axis,
   a first ramp-ball motion converter, having a first ramp portion axially constrained and actuatable in rotation around the actuating axis, a second ramp portion coupled to the piston and facing the first ramp portion, and a plurality of rolling elements interposed in contact between ramp tracks formed by the first and second ramp portion, so that the rotation of the first ramp portion with respect to the second ramp portion brings about a braking translation of the second ramp portion together with the piston with respect to the first ramp portion, along the actuating axis, a second screw and nut motion converter, connected between the second ramp portion and the piston, so that a rotation of the second ramp portion with respect to the piston about the actuating axis brings about a compensating translation of the piston with respect to the second ramp portion, along the actuating axis, a torque limiter that:

makes a torsional connection of the first ramp portion with the second ramp portion, so that they rotate together about the actuating axis, until a predetermined limit torque in said torsional connection is reached, decouples the rotation of the first ramp portion with respect to the second ramp portion about the actuating axis when the predetermined limit torque is exceeded, wherein the torque limiter comprises one or more jaws coupled in a rotationally fixed manner to a coupling seat of the second portion of the ramp and elastically biased in engagement with a transmission shaft formed at the first portion of the ramp.

2. The actuating device according to claim 1, wherein the second portion of the ramp is directly formed on a screw body of the second nut and screw motion converter.

3. The actuating device according to claim 2, wherein the piston forms:

a cylindrical wall with a threaded inner piston surface screwed onto the screw body such as to form a nut of the second nut and screw motion converter, anti-rotation means which prevent rotation of the piston about the actuating axis.

4. The actuating device according to claim 3, wherein the screw body forms: —a cylindrical side wall, concentric with respect to the actuating axis, with an outer thread for screwing with the inner thread of the piston, a screw front wall facing the direction of advancement of the piston and a screw rear wall opposite to the screw front wall, said screw rear wall forming one or more second rolling tracks of the ramp cam tracks, a coupling seat extended radially and axially internally with respect to the outer thread and which houses the torque limiter.

5. The actuating device according to claim 4, wherein the first ramp portion is formed by a rotor body having:

a rotor front wall facing a direction of advancement of the piston and forming one or more first rolling tracks of the ramp tracks, a drive shaft protruding from the rotor front wall, coaxial to the actuating shaft, and connected to the torque limiter, wherein the second ramp portion is rotatably supported and centered on the drive shaft.

6. The actuating device according to claim 5, wherein the screw rear wall forms a through-hole opening into the coupling seat, through which the drive shaft extends into the coupling seat, wherein the through-hole forms a centered and rotation permitting support of the screw body with respect to the rotor body.

7. The actuating device according to claim 5, wherein a bearing assembly supports the rotor body in axial abutment and concentrically with respect to the actuating axis, said bearing assembly being positioned inside the rotor body.

8. The actuating device according to claim 5, wherein the rolling elements are further contained by a containment cage interposed between the first ramp portion and second ramp portion and supported on the drive shaft.

9. The actuating device according to claim 5, wherein the first ramp portion, the second ramp portion and the rolling elements are elastically pushed into mutual contact in the direction of the actuating axis.

10. The actuating device according to claim 9, comprising an axial preload spring, configured to axially push the assembly of the first motion converter and the torque limiter.

11. The actuating device according to claim 10, wherein the axial preload spring is supported on the drive shaft and clamped between a free end portion of the drive shaft and the front wall of the screw body.

12. The actuating device according to claim 5, wherein the drive shaft forms an axial through-hole which accommodates a tie rod having:

an enlarged front end portion, axially resting against a front wall of the screw body, and a portion of the rear end protruding into an inner cavity of the rotor body, wherein an axial preload spring is clamped between the rear end portion of the tie rod and a bottom surface of the inner cavity of the rotor body through the interposition of a rolling axial bearing.

13. The actuating device according to claim 1, wherein the first motion converter, the second motion converter and the torque limiter are at least partially or completely housed in an inner piston cavity.

14. The actuating device according to claim 1, wherein the torque limiter is at least partially or completely housed in an inner cavity of a screw body of the second motion converter.

15. The actuating device according to claim 1, wherein the torque limiter comprises one or more jaws coupled in a rotationally fixed manner with said screw body and elastically biased in engagement with the drive shaft of the rotor body.

16. The actuating device according to claim 15, wherein:

the coupling seat forms two abutment surfaces that are diametrically opposite to each other with respect to the actuating axis and two lateral guiding surfaces, the jaws are accommodated between the side guiding surfaces, and guided radially to the actuating axis, preloaded elastic elements are arranged between the abutment surfaces and the jaws.

17. The actuating device according to one of claim 15, wherein the torque limiter comprises two jaws positioned mutually opposite with respect to the drive shaft.

18. The actuating device according to claim 16, wherein the torque limiter comprises two jaws positioned mutually opposite with respect to the drive shaft.

19. The disc brake, comprising a caliper with two spaced apart side walls which delimit a disc space to accommodate a brake disc portion, means for fixing the caliper connects the side walls to each other, at least one pad seat formed in each of said side walls and adapted to accommodate at least one friction pad, thrust means constrained to one or both side walls and adapted to push the friction pads against the brake disc to clamp it, wherein the thrust means comprise an actuating device according to claim 1.

* * * * *